(12) United States Patent
Sheridan et al.

(10) Patent No.: US 12,002,163 B1
(45) Date of Patent: *Jun. 4, 2024

(54) AUTOMATICALLY GENERATING PANORAMA TOURS

(71) Applicant: Google LLC, Mountain View, CA (US)

(72) Inventors: Alan Sheridan, Apex, NC (US); Aaron Michael Donsbach, Seattle, WA (US); Daniel Joseph Filip, San Jose, CA (US)

(73) Assignee: Google LLC, Mountain View, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 17/943,282

(22) Filed: Sep. 13, 2022

Related U.S. Application Data

(63) Continuation of application No. 16/834,074, filed on Mar. 30, 2020, now Pat. No. 11,481,977, which is a
(Continued)

(51) Int. Cl.
*G06T 19/00* (2011.01)
*G06F 3/04845* (2022.01)
(Continued)

(52) U.S. Cl.
CPC ........ *G06T 19/003* (2013.01); *G06F 3/04845* (2013.01); *G06F 3/0485* (2013.01);
(Continued)

(58) Field of Classification Search
CPC ........... G06T 19/003; G06T 3/60; G06T 5/50; G06T 2207/20221; G06F 3/04845; G06F 3/0485; G06F 16/5866
See application file for complete search history.

(56) References Cited

U.S. PATENT DOCUMENTS 6,199,014 B1 * 3/2001 Walker ............... G01C 21/3647
701/428
6,351,710 B1 2/2002 Mays
(Continued)

FOREIGN PATENT DOCUMENTS

AU 3116097 A 11/1997
CN 101467005 A 6/2009
(Continued)

OTHER PUBLICATIONS

Hearing Notice for Indian Patent Application No. 201647038961 dated Aug. 20, 2019. 3 pages.
(Continued)

*Primary Examiner* — Siamak Harandi
(74) *Attorney, Agent, or Firm* — Lerner David LLP

(57) ABSTRACT

In one aspect, a request to generate an automated tour based on a set of panoramic images is received. Each particular panoramic image is associated with geographic location information and linking information linking the particular panoramic image with one or more other panoramic images in the set. A starting panoramic image and a second panoramic image are determined based at least in part on the starting panoramic image and the linking information associated with the starting and second panoramic images. A first transition between the starting panoramic image and the second panoramic image is also determined based at least in part on the linking information for these panoramic images. Additional panoramic images as well as a second transition for between the additional panoramic images are also determined. The determined panoramic images and transitions are added to the tour according to an order of the tour.

20 Claims, 14 Drawing Sheets

Related U.S. Application Data continuation of application No. 15/790,315, filed on Oct. 23, 2017, now Pat. No. 10,643,385, which is a continuation of application No. 15/134,762, filed on Apr. 21, 2016, now Pat. No. 9,830,745, which is a continuation of application No. 14/850,334, filed on Sep. 10, 2015, now Pat. No. 9,342,911, which is a continuation of application No. 14/260,862, filed on Apr. 24, 2014, now Pat. No. 9,189,839.

(51) Int. Cl.
    *G06F 3/0485*      (2022.01)
    *G06F 16/58*      (2019.01)
    *G06T 3/60*      (2006.01)
    *G06T 5/50*      (2006.01)

(52) U.S. Cl.
CPC ............ *G06F 16/5866* (2019.01); *G06T 3/60* (2013.01); *G06T 5/50* (2013.01); *G06T 2207/20221* (2013.01)

(56) References Cited

U.S. PATENT DOCUMENTS

| | | | |
|---|---|---|---|
| 6,437,797 | B1 | 8/2002 | Ota |
| 7,096,428 | B2 | 8/2006 | Foote et al. |
| 7,746,376 | B2 | 6/2010 | Mendoza et al. |
| 7,810,037 | B1 | 10/2010 | Edwards et al. |
| 7,873,468 | B2 | 1/2011 | Matsuura et al. |
| 7,933,395 | B1 | 4/2011 | Bailly et al. |
| 8,015,172 | B1 | 9/2011 | Cave et al. |
| 8,073,461 | B2 | 12/2011 | Altman et al. |
| 8,131,118 | B1 | 3/2012 | Jing et al. |
| 8,200,712 | B2 | 6/2012 | Koch et al. |
| 8,493,408 | B2 | 7/2013 | Williamson et al. |
| 8,930,141 | B2 | 1/2015 | Wither et al. |
| 2001/0010546 | A1 | 8/2001 | Chen |
| 2001/0017668 | A1 | 8/2001 | Wilcock et al. |
| 2002/0042813 | A1 | 4/2002 | Ullman et al. |
| 2002/0122073 | A1 | 9/2002 | Abrams et al. |
| 2002/0128766 | A1 | 9/2002 | Petzold et al. |
| 2003/0007668 | A1 | 1/2003 | Kotake et al. |
| 2004/0054428 | A1 | 3/2004 | Sheha et al. |
| 2004/0064338 | A1 | 4/2004 | Shiota et al. |
| 2005/0270311 | A1 | 12/2005 | Rasmussen et al. |
| 2006/0253781 | A1 | 11/2006 | Pea et al. |
| 2006/0271691 | A1 | 11/2006 | Jacobs et al. |
| 2007/0198182 | A1 | 8/2007 | Singh |
| 2007/0244634 | A1 | 10/2007 | Koch et al. |
| 2007/0273758 | A1 | 11/2007 | Mendoza et al. |
| 2008/0033641 | A1 | 2/2008 | Medalia |
| 2008/0118184 | A1 | 5/2008 | Panabaker et al. |
| 2008/0215964 | A1 | 9/2008 | Abrams et al. |
| 2009/0055087 | A1 | 2/2009 | Beacher |
| 2009/0135178 | A1 | 5/2009 | Aihara et al. |
| 2009/0202102 | A1 | 8/2009 | Miranda et al. |
| 2009/0210277 | A1 | 8/2009 | Hardin et al. |
| 2009/0284551 | A1 | 11/2009 | Stanton |
| 2009/0307222 | A1 | 12/2009 | Matraszek et al. |
| 2010/0023254 | A1 | 1/2010 | Machino |
| 2010/0082194 | A1 | 4/2010 | Yabushita et al. |
| 2010/0146397 | A1 | 6/2010 | Koch et al. |
| 2010/0215250 | A1 | 8/2010 | Zhu |
| 2010/0259641 | A1 | 10/2010 | Fujimoto |
| 2010/0325589 | A1* | 12/2010 | Ofek ............... G01C 21/367 345/660 |
| 2011/0118974 | A1 | 5/2011 | Chang et al. |
| 2011/0131597 | A1 | 6/2011 | Cera et al. |
| 2011/0196897 | A1 | 8/2011 | Koch et al. |
| 2011/0211040 | A1 | 9/2011 | Lindemann et al. |
| 2011/0212717 | A1 | 9/2011 | Rhoads et al. |
| 2011/0214072 | A1 | 9/2011 | Lindemann et al. |
| 2011/0231745 | A1 | 9/2011 | Levesque et al. |
| 2011/0280497 | A1 | 11/2011 | Berger et al. |
| 2011/0283210 | A1 | 11/2011 | Berger et al. |
| 2012/0033032 | A1 | 2/2012 | Kankainen |
| 2012/0039546 | A1 | 2/2012 | Berger et al. |
| 2012/0059720 | A1 | 3/2012 | Musabji et al. |
| 2012/0066573 | A1 | 3/2012 | Berger et al. |
| 2012/0082401 | A1 | 4/2012 | Berger et al. |
| 2012/0092266 | A1 | 4/2012 | Akella |
| 2012/0127169 | A1 | 5/2012 | Barcay et al. |
| 2012/0141023 | A1 | 6/2012 | Wang et al. |
| 2012/0200665 | A1 | 8/2012 | Furumura et al. |
| 2012/0246562 | A1 | 9/2012 | Maness et al. |
| 2012/0254804 | A1 | 10/2012 | Sheha et al. |
| 2012/0323485 | A1 | 12/2012 | Mutoh |
| 2012/0324373 | A1 | 12/2012 | Halliday et al. |
| 2013/0018574 | A1 | 1/2013 | Adler |
| 2013/0090850 | A1 | 4/2013 | Mays |
| 2013/0103303 | A1 | 4/2013 | Lynch |
| 2013/0116855 | A1 | 5/2013 | Nielsen et al. |
| 2013/0151597 | A1 | 6/2013 | Akiya et al. |
| 2013/0191359 | A1 | 7/2013 | Meadow et al. |
| 2013/0201216 | A1 | 8/2013 | Nakamura et al. |
| 2013/0325319 | A1 | 12/2013 | Moore et al. |
| 2013/0332856 | A1 | 12/2013 | Sanders et al. |
| 2013/0332890 | A1 | 12/2013 | Ramic et al. |
| 2014/0022242 | A1 | 1/2014 | Wenzel et al. |
| 2014/0240311 | A1 | 8/2014 | Xu et al. |
| 2014/0244159 | A1 | 8/2014 | Musabji et al. |
| 2014/0330814 | A1 | 11/2014 | Li |
| 2015/0178561 | A1 | 6/2015 | Hensel et al. |

FOREIGN PATENT DOCUMENTS

| | | |
|---|---|---|
| CN | 101782394 A | 7/2010 |
| CN | 103162696 A | 6/2013 |
| CN | 2013100375667 | 8/2014 |
| EP | 1404105 A2 | 3/2004 |
| JP | H09304098 A | 11/1997 |
| JP | H10126731 A | 5/1998 |
| JP | 2002258740 A | 9/2002 |
| JP | 2006084184 A | 3/2006 |
| JP | 2006098225 A | 4/2006 |
| JP | 2011515717 A | 5/2011 |
| JP | 2011137638 A | 7/2011 |
| WO | 0227272 A1 | 4/2002 |
| WO | 2006039389 A2 | 4/2006 |
| WO | 2009120303 A1 | 10/2009 |

OTHER PUBLICATIONS

Refusal Order for Indian Patent Application No. 201647038961 dated Sep. 24, 2019. 6 pages.

Office Action for Brazilian Patent Application No. 1120160269420 dated May 31, 2020. 4 pages.

Examination Report for European Patent Application No. 19178223.4 dated Dec. 18, 2020. 6 pages.

Foote, et al., "FlyCam: Practical Panoramic Video and Automatic Camera Control", FX Palo Alto Laboratory, Inc., copyright 2000, pp. 1419-1422.

Boult, et al., "Omnidirectional Video Applications", VAST Lab, copyright 2000.

Kang, et al., "Virtual Navigation of Complex Scenes using Clusters of Cylindrical Panoramic Images", copyright 1998.

"Google Business Photos Trusted Agency Training", [online], retrieved Oct. 2, 2013, <https://sites.google.com/google.com/trusted-agency-training/en/pano-editor>, 23 pages.

"Kolor Panotour Pro", [online], retrieved Nov. 13, 2013, <http://www.kolor.com/panotour-pro-profesionnal-360-virtual-tour-software-home.html>, 1 page.

"Panotour Pro Documentation", [online], retrieved Nov. 13, 2013, <http://www.autopano.net/wiki-en/action/view/Panotour_Pro_Documentation>, 2 pages.

"Building a Tour (Pano2VR)" [online], retrieved May 5, 2014, <http://ggnome.com/wiki/building_a_Tour_(Pano2VR)>, 14 pages.

"Easypano The Virtual Tour Way" [online], Copyright 2001-2014, <http://www.easypano.com/video-tutorial/>, 1 page.

(56) References Cited

OTHER PUBLICATIONS

"Imagery and Street View Overview" [online], Copyright 2014, <https://support.google.com/maps/answer/3093457?hl=en&rd=1>, 2 pages.
Jeremy Pack, Finding the Best Panoramas, Fall 2011, 5 pages.
"Google Earth Showcase", [online], retrieved May 5, 2014, <https://www.google.com/earth/explore/showcase/>, 5 pages.
"Using Tours" [online], Copyright 2014, <https://support.google.com/earth/answer/148174?hl=en>, 4 pages.
"Tour Builder", [online], Copyright 2013, <https://tourbuilder.withgoogle.com/about/faq>, 1 page.
"Google Earth Outreach Storytelling with maps using Tour Builder", [online], retrieved May 5, 2014, <https://www.google.com/earth/outreach/tutorials/tourbuilder.html>, 38 pages.
"Take 100,000 more tours inside Google Earth", Jan. 30, 2013, <https://www.cnet.com/news/take-100000-more-tours-inside-google-earth/>, 3 pages.
Chen, B. et al. (2009). Integrated Videos and Maps for Driving Directions. User Interface Science and Technology (Proceedings of UIST 2009), 9 pages. Retrieved from <http://research.microsoft.com/en-us/um/people/cohen/vdd_webpage/>.
Bradley, D. et al. (Oct. 1-2, 2005). Image-Based Navigation in Real Environments Using Panoramas. IEEE International Workshop on Haptic Audio Environments and their Applications (HAVE'2005)—HAVE Manuscript 20. National Research Council of Canada, 5 pages.
Zhao, Q. et al. (Dec. 2013). Cube2Video: Navigate Between Cubic Panoramas in Real-Time. IEEE Transactions on Multimedia, vol. 15, No. 8, pp. 1745-1754.
Google Street View Hyperlapse. (© 2013). Teehan+Lax Labs. This web application can be accessed at: <http://hyperlapse.tllabs.io/>.
Google Street View and Driving Directions. Google Driving View. (© 2011). RedTree Software. This web application can be accessed at: <http://www.redtreesoft.com/Google/GoogleDrivingView.htm>. http://web.archive.org/web/2013101105523/http://en.wikipedia.org/wiki/Travelling_salesman_problem, archived on Oct. 11, 2013.
3D Photo Walls: Amazing new way to scan hundreds of images in seconds, copyright VenueView Inc. 2010, accessed at http://venueview.com/3d-photo-wall/, accessed on Sep. 28, 2012,5 pages.
Debevec, Paul E., "View-Dependent Texture Mapping," in Modeling and Rendering Architecture from Photographs, Chapter 6, pp. 81-95, thesis submitted to Computer Science faculty of U.c. Berkeley, United States (Fall 1996).
Fischler, M.A., and Bolles, rCc., "Random Sample Consensus: A Paradigm for Model Fitting with Applications to Image Analysis and Automated Cartography," Jun. 1981, vol. 24, No. 6, pp. 381-395.
"Microsoft Photosynth: Home," photosynth.net, copyright Microsoft 2008, accessed at accessed on Mar. 22, 2013, 1 page.
O'Connor, Tim, "Make a 3D Photo Tour with Live Search Maps," published Apr. 15, 2008, Windows Live Photo & Video Blog: Official blog for the Windows Live Digital Memories Experience team, blogs.MSDN.com, accessed at http://blogs.msdn.com/b/pix/archive/2008/04/15/make-a-3 d-photo-tour-with-live-.
Snavely, et al., "Photo Tourism: Exploring Photo Collections in 3D," ACM Transactions on Graphics 25(3), Association for Computing Machinery, Inc., United.
Szeliski, R., "Image Alignment and Stitching: A Tutorial," Foundations and Trends® in Computer, Computer Graphics and Vision, vol. 2, No. 1, 2006, pp. 1-104.

International Search Report and Written Opinion for Application No. PCT/US2015/037716 dated Sep. 23, 2015.
Sequeira V. et al. "3D reality modelling: photo-realistic 3D models of real world scenes," 3D Data Processing Visualization and Transmission, 2002. Proceedings. First International Symposium on Jun. 19-21, 2002, Piscataway, NJ, USA, IEEE, Jun. 19, 2002 (Jun. 19, 2002), pp. 776-783, XP010596749.
Neumann U. et al. "Augmented virtual environments (AVE): dynamic fusion of imagery and 3D models," IEEE Virtual Reality 2003. Proceedings. Los Angeles, California; IEEE Computer Society, Los Alamitos, Mar. 22, 2003 (Mar. 22, 2003), pp. 61-67, XP010637612.
Chi Peng et al. "Integrated Google Maps and smooth street view videos for route planning," Computer Symposium (ICS), 2010 International, IEEE, Piscataway, NJ, USA, Dec. 16, 2010 (Dec. 16, 2010), pp. 319-324, XP031847757.
Chen S. E. et al. "View interpolation for image synthesis," Proceedings of the 20th Annual Conference on Computer Graphics and Interface Techniques, 1993, pp. 279-288, XP002269080.
Chen S. E. "QuickTime VR—an image-based approach to virtual environment navigation," Proceedings of the 22nd Annual Conference on Computerg Graphcs and Interactive Techniques, 1995, pp. 29-38, XP002269081.
J. Y. Zheng, M. Shi. "Mapping cityscapes into cyberspace for visualization." Computer Animation and Virtual Worlds, vol. 16, 2005, pp. 97-107, XP002746538.
International Search Report and Written Opinion for PCT Application No. PCT/US2015/039514, dated Nov. 20, 2015.
International Preliminary Report on Patentability for PCT Application No. PCT/US2015/037716, dated Dec. 27, 2016.
International Preliminary Report on Patentability for PCT Application No. PCT/US2015/039514, dated Jan. 26, 2017.
Examination Report No. 1 for Australian Patent Application No. 2015279837, dated May 2, 2017. 2 pages.
Notice of Acceptance for Australian Patent Application No. 2015279837, dated May 18, 2017. 3 pages.
Johannes Kopf et al: "Street slide: Browsing Street Level Imagery", ACM SIGGRAPH 2010 Papers, ACM, 2 Penn Plaza, Suite 701 New York NY 10121-0701 USA, Jul. 26, 2010 (Jul. 26, 2010), pp. 1-8, XP058312514.
M. Bredif: "Image-Based Rendering of LOD1 30 City Models for traffic-augmented Immersive Street-view Navigation", ISPRS Annals of Photogrammetry, Remote Sensing and Spatial Information Sciences, val. II-3/W3, Nov. 12, 2013 (Nov. 12, 2013), pp. 7-11, XP55481080.
Office Action for Chinese Patent Application No. 201580025571.3, dated Jan. 4, 2019.
Notice of Reasons for Rejection for Japanese Patent Application No. 2018-088741 dated May 27, 2019.
Translation of Japanese Patent Application No. 2006-084184, paragraph Nos. [0023], [0034], [0035], [0036], [0044], and [0045].
Translation of Japanese Patent Application No. H09-304098, paragraph No. [0082].
Translation of Published Japanese Translation No. 2011-515717 of the PCT International Publication, paragraph No. [0026].
Translation of Japanese Patent Application No. 2006-098225, paragraph No. [0050].
Translation of Japanese Patent Application No. 2011-137638, paragraph No. [0017].
Decision of Rejection for Chinese Patent Application No. 201580025571.3 dated Aug. 2, 2019.

\* cited by examiner

AUTOMATICALLY GENERATING PANORAMA TOURS

CROSS-REFERENCE TO RELATED APPLICATIONS

The present application is a continuation of U.S. patent application Ser. No. 16/834,074, filed Mar. 30, 2020, which is a continuation of U.S. patent application Ser. No. 15/790,315, filed Oct. 23, 2017, now issued as U.S. Pat. No. 10,643,385, which is a continuation of U.S. patent application Ser. No. 15/134,762, filed Apr. 21, 2016, now issued as U.S. Pat. No. 9,830,745, which is a continuation of U.S. patent application Ser. No. 14/850,334, filed Sep. 10, 2015, now issued as U.S. Pat. No. 9,342,911, which is a continuation of U.S. patent application Ser. No. 14/260,862, filed Apr. 24, 2014, now issued as U.S. Pat. No. 9,189,839, the disclosures of which are incorporated herein by reference.

BACKGROUND

Various systems may provide users with images of different locations. Some systems provide users with panoramic images. For example, panoramic images may include an image or collection of images having a field of view which is greater than that of the human eye, e.g., 180 degrees or greater. Some panoramas may provide a 360-degree view of a location.

Some systems may allow users to view images in sequences, such as in time or space. In some examples, these systems can provide a navigation experience in a remote or interesting location. Some systems allow users to feel as if they are rotating within a virtual world by clicking on the edges of a displayed portion of a panorama and having the panorama appear to "rotate" in the direction of the clicked edge.

SUMMARY

Aspects of the disclosure provide a computer-implemented method for generating automated tours using images. The method includes receiving a request, by one or more computing devices, to generate an automated tour based on a set of images. Each particular image in the set of images is associated with geographic location information and linking information linking the particular image with one or more other images in the set of images. The one or more computing devices identify a starting image of the set of images, determine a second image of the set of images based at least in part on the starting image and the linking information associated with the starting and second images, determine a first transition of a first transition mode between the starting image and the second image based at least in part on the linking information associated with the starting image and the second image, determine additional images from the set of images for the tour based at least in part on the linking information associated with the additional images and whether a minimum image quantity constraint has been met, and determine a second transition of a second transition mode, different from the first transition mode, for between ones of the additional images. The one or more computing devices add to the tour an identifier for the first image, the first transition, a second identifier for the second image, the second transition, and the additional images according to an order of the tour.

In one example, identifying the starting image is based on an image-type identifier associated with the starting image. In another example, the second transition of the second transition mode is not added to the tour according to the order of the tour until a second image constraint has been met for the tour, and the second image constraint includes a fixed number of images that have been added with transitions of the first transition mode. In another example, the second transition of a second transition mode is not added to the tour according to the order of the tour until a second image constraint has been met for the tour, and the second image constraint includes adding a given image of the set of images having linking information indicating that the given image is linked to at least three other images of the set of images. In another example, the second transition is determined based on a set of parameters that includes a transition turn percent parameter that identifies a percentage of transitions in the automated tour that will include at least some degree of rotation. In another example, the second transition is determined based on a set of parameters that includes a skip rotate percentage parameter that identifies a percentage of transitions in the automated tour that will not be followed by a panning rotation. In another example, the second transition is determined based on a set of parameters that includes a minimum degree of rotation parameter that identifies a minimum required degree of rotation for transitions between images. In another example, the second transition is determined based on a set of parameters that includes an overlap threshold parameter that identifies a minimum degree of overlap in the fields of view between two images at a particular orientation. In another example, determining the additional images from the set of images for the tour is further based on whether the automated tour includes a particular image of the set of images.

Another aspect of the disclosure provides a system for generating automated tours using images. The system includes one or more computing devices. The one or more computing devices are configured to receive a request to generate an automated tour based on a set of images. Each particular image in the set of images is associated with geographic location information and linking information linking the particular image with one or more other images in the set of images. The one or more computing devices are also configured to identify a starting image of the set of images; determine a second image of the set of images based at least in part on the starting image and the linking information associated with the starting and second images; determine a first transition of a first transition mode between the starting image and the second image based at least in part on the linking information associated with the starting image and the second image; determine additional images from the set of images for the tour based at least in part on the linking information associated with the additional images and whether a minimum image quantity constraint has been met; determine a second transition of a second transition mode, different from the first transition mode, for between ones of the additional images; and add to the tour: an identifier for the first image, the first transition, a second identifier for the second image, the second transition, and the additional images according to an order of the tour.

In one example, the one or more computing devices are configured to determine the starting image based on an image-type identifier associated with the starting image. In another example, the one or more computing devices are configured to add the second transition of a second transition mode only when a second image constraint has been met for the tour, and the second image constraint includes a fixed number of images have been added with transitions of the first transition mode. In another example, the one or more computing devices are configured to add the second transition of a second transition mode only when a second image constraint has been met for the tour, and the second image constraint includes adding a given image of the set of images having linking information indicating that the given image is linked to at least three other images of the set of images. In another example, the one or more computing devices are configured to determine the second transition based on a set of parameters that includes a transition turn percent parameter that identifies a percentage of transitions in the automated tour that will include at least some degree of rotation. In another example, the one or more computing devices are configured to determine the second transition based on a set of parameters that includes a skip rotate percentage parameter that identifies a percentage of transitions in the automated tour that will not be followed by a panning rotation. In another example, the one or more computing devices are configured to determine the second transition based on a set of parameters that includes a minimum degree of rotation parameter that identifies a minimum required degree of rotation for transitions between images.

A further aspect of the disclosure provides a non-transitory computer-readable storage medium on which computer readable instructions of a program are stored. The instructions, when executed by one or more processors, because the processors to perform a method of generating automated tours using images. The method includes identifying a set of images, each particular image in the set of images being associated with geographic location information and linking information linking that image with one or more other images; identifying a starting image of the set of images; and generating an automated tour based on at least the starting image and a second image, the linking information associated with the set of images, and a set of requirements. The set of requirements includes a first requirement that the automated tour begin by displaying the starting image, a second requirement that the automated tour include a first transition of a first transition mode between the starting image and the second image of the set based at least in part on the linking information associated with the starting image and the second image, a third requirement that additional images of the set of images are added to the automated tour based on the linking information associated with the additional images until a minimum image quantity constraint has been met, and a fourth requirement that the automated tour include a second transition of a second transition mode, different from the first transition mode, between two of the additional images, and that the second transition mode is determined according to a set of parameters.

In one example, identifying the starting image is based on an image-type identifier associated with the starting image. In another example, the method further comprises identifying the particular image based on a second image-type identifier associated with the starting image, the second image-type identifier being different from the image-type identifier. In another example, the third requirement further includes that additional images of the set of images are added to the automated tour based on the linking information associated with the additional images when at least one of (a) the minimum image quantity constraint has been met or (b) the automated tour includes a particular image of the set of images.

DETAILED DESCRIPTION

Overview

Figure 1:
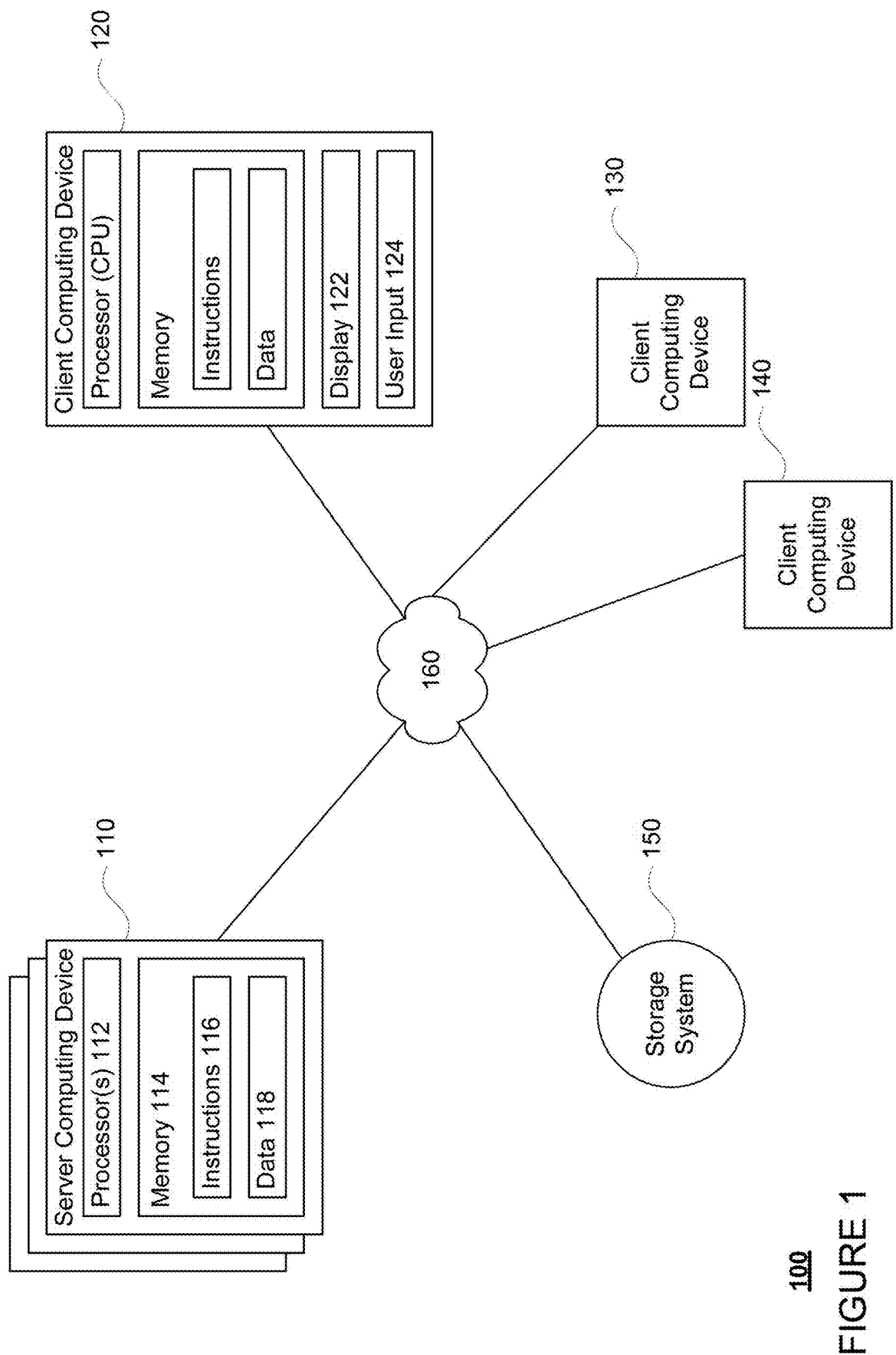
FIG. 1 is a functional diagram of an example system in accordance with aspects of the disclosure.

The technology relates to automatically generating automated tours using panoramas or panoramic images. As an example, a user of a computing device may view or create an automated tour by selecting or indicating a starting panoramic image from a set of pre-linked panoramic images as well as one or more other panoramic images of the set. In response, an automated tour may be generated by stringing together the selected panoramic image, the one or more other panoramic images, and, in some examples, additional panoramic images of the set. When the automated tour is displayed, it may appears as a virtual tour of a location captured in the panoramic images of the tour and may provide a user with a feeling that he or she is moving (e.g., walking or running, and in some cases turning) through that location.

As noted above, panoramic images may be arranged in sets. Each panoramic image in a set may be linked to one or more other panoramic images in the set. For example, panoramic images may be linked to one another manually or automatically based on location and orientation information and subsequently confirmed by a user. In this regard, a first image may be associated with linking information indicating an orientation of the first image that aligns with a second orientation of a second image to indicate a physical path between the images. This relationship may be displayed, for example, in a "constellation" or a series of points representing the location of panoramic images of the set with lines linking them together.

In order to generate an automated tour, a pre-linked set of panoramic images and a starting image for the tour are identified. This may be done manually, for example, by a user specifically selecting a particular panoramic image of a pre-linked set. Alternatively, a user may have pre-designated a particular image with an identifier indicating that the particular image is a starting image or has some type of relationship to the location (e.g., exterior of a building, interior of a building, hotel lobby, includes an exterior business sign, etc.). In this example, when a user requests to view an automated tour of a location, the system may automatically identify the pre-linked set for that location as well as the starting image for the set using the identifier.

In addition, a second panoramic image of the pre-linked set may also be identified. As with the starting image, the second panoramic image may be selected manually or based on an identifier (e.g., interior of a building, best interior image of a building, includes an interior business sign, etc.).

An automated tour may then be generated using a number of predetermined requirements. As an example, an automated tour may be generated for a location corresponding to a business where a starting image is an exterior panoramic image and a second panoramic image is an interior panoramic image. A requirement may include that the automated tour begin by displaying the starting image and transitioning between images in a first transition mode (e.g., the direction of motion is consistent, such as, without rotation) according to the constellation until a predetermined number of images is displayed (e.g., 3 or 4) or a branch (in the constellation of the pre-liked set) is reached.

At this point, a requirement may include that the tour continue to display images until the second panoramic image is reached, transitioning between images in a second transition mode. The second transition mode may include various parameters that enable different automated tours to be less predictable and more varied. For example, transitions between images may include a panning rotation (rotating within a panoramic image) in a first panoramic image before displaying the second panoramic image as well as a panning rotation after the transition is complete. A transition turn percent parameter may be used to determine a percentage of transitions that will include at least some degree of rotation (e.g., 35%). A skip rotate percentage parameter may be used to determine a percentage of transitions which will not be followed immediately by a panning rotation (e.g., 35%). Another parameter may include a minimum rotation degree (e.g., 130 degrees) for transitions. In this regard, the transitions between images need not always be from the point of view of a user moving forward through space, but also to the side, backwards, etc.

In order to maintain overlapping views between transitions, an overlap threshold parameter may be used. For example, the fields of view of two panoramic images may be determined based on the parameters of the first or second transition mode. These fields of view may be projected onto an imaginary wall at a fixed distance. If the overlap of (a) the cone that is projected from the first image with (b) the cone that is projected from the second panoramic image does not satisfy the overlap threshold parameter (e.g., a threshold of 50% overlap), then the amount of panning rotation in the transition from the first panoramic image may be increased in order to ensure that the overlap threshold parameter is satisfied. If the rotation required to meet the overlap is less than the minimum rotation degree, the minimum rotation degree may be adjusted, for example, by decreasing the value or simply foregoing the requirement.

Another requirement may include that once the second panoramic image is reached, if at least a minimum number of panoramic images have been displayed, then the automated tour may end. If not, the automated tour may continue to include other panoramic images in the set, for example, by using the constellation to reach the farthest panoramic image from the second panoramic image until the minimum number of panoramic images has been reached. In some examples, the last panoramic image may be rotated so that the last view in an automated tour is oriented towards the second panoramic image.

Other parameters may also be used to generate the automated tour. For example, the amount of time that it takes to complete a transition between images, the percentage of time spent rotating for a transition, the minimum amount of time for a rotation, the speed of a rotation (e.g., degrees per second of rotation), whether that speed is adjusted during a rotation (e.g., faster, slower, faster), etc.

The automated tours may be pre-determined using the above features and then stored until requested by a user to be displayed. The stored automated tour may include, for example, a set of parameters including identifiers for panoramas to be displayed, order, rotations, timing, and transition information. Alternatively, the automated tours may be generated "on demand" in response to a specific request for an automated tour.

The features described above may provide a user with a smooth and visually appealing view of a location. In addition, given a pre-linked set that includes a sufficient number of panoramic images, an automated tour may provide a user with a comprehensive view of a location without needing to "click" multiple times in order to maneuver around the location.

Example Systems

Figure 2:
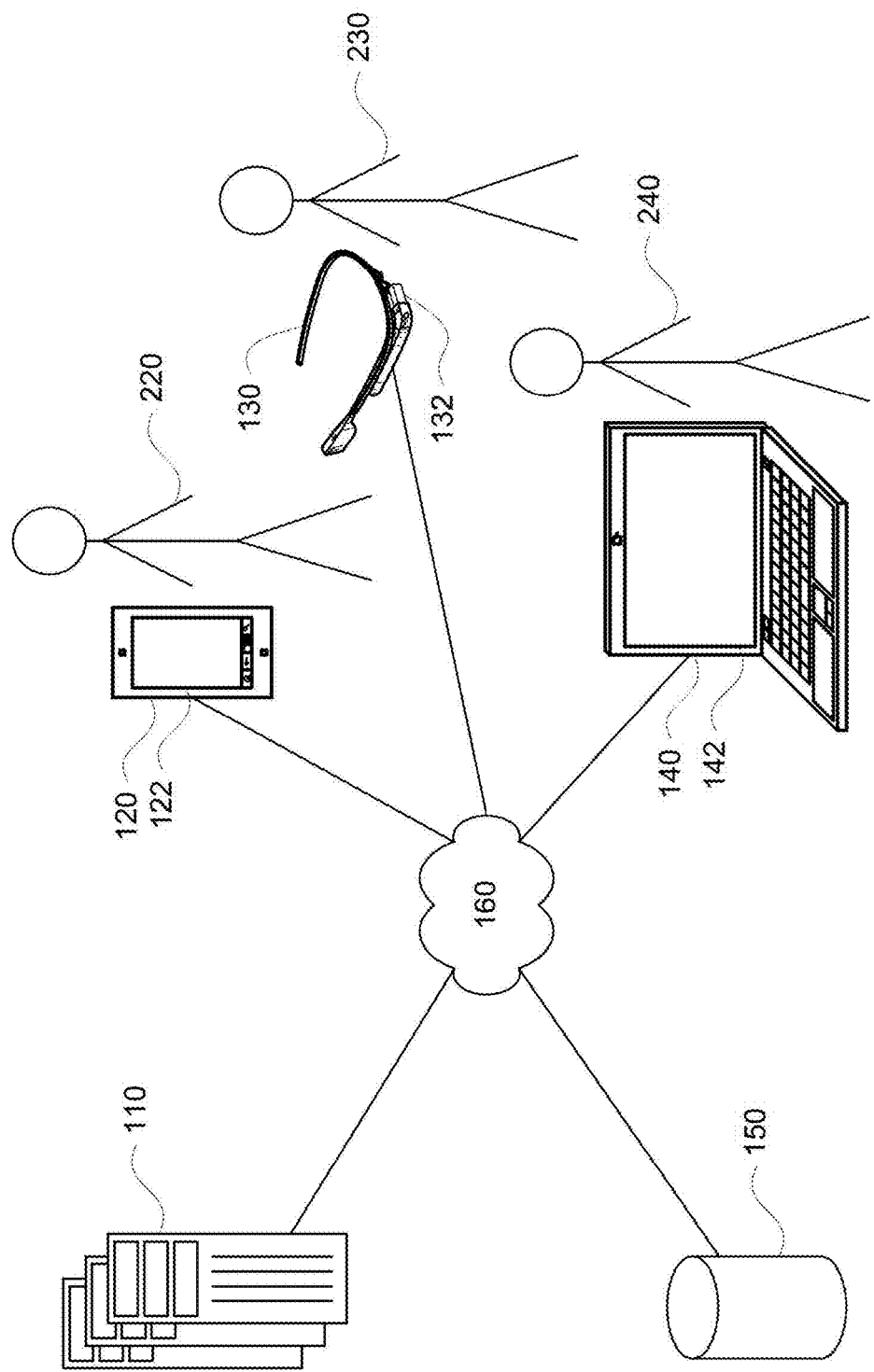
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 250, or 250, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various images, such as panoramic images including a single image or a collection of images as described above having a field of view which is greater than that of the human eye, e.g., 180 degrees or greater. The example panoramic images described herein provide a 360-degree view of a location, though other types of images, such as those having a view of less than 360 degrees as well as combinations of images with different viewing areas, may also be used. In addition, each panoramic image may be associated with an image identifier that may be used to retrieve the panoramic image, geographic location information indicating the location and orientation at which the panoramic image was captured (e.g., a latitude longitude pair as well as an indication of which portion of the panoramic image faces a given direction such as North), as well as timestamp information indicating the date and time at which the panoramic image was captured.

Figure 3:
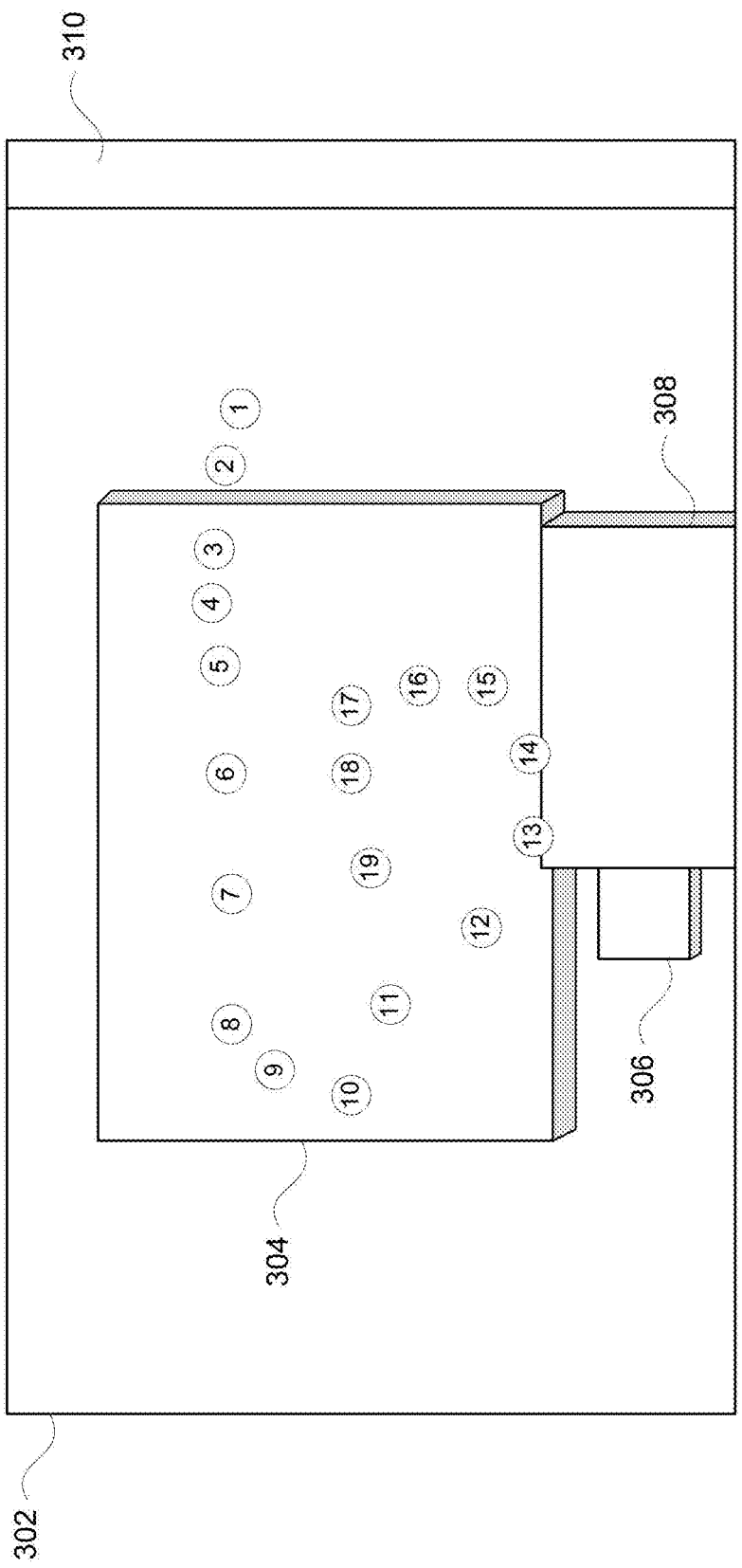
FIG. 3 is an example diagram of panoramic image information in accordance with aspects of the disclosure.

FIG. 3 is an example 300 of a map 302 of an area including a set of buildings 304, 306, and 308 located near a road 310. Map 302 also includes the geographic locations of a plurality of panoramic images 1-19. The panoramic images are depicted relative to the set of buildings 304, 306, and 308.

In some examples, the storage system may store a set of panoramic images that have been pre-linked together or pre-linked sets of panoramic images. A pre-linked set of panoramic images may include information such as the panoramic images themselves or the image identifiers for the panoramic images in the sets. In addition, each of the panoramic images of a set may be associated with one or more links to other panoramic images. In this regard, a panoramic image may be linked to one or more other panoramic images in the set in a particular arrangement as described in more detail below. The panoramic images may be linked to one another manually or automatically based on location and orientation information and subsequently confirmed by a user.

As an example, the links may describe physical relationships or virtual paths between the panoramic images that may be used to provide a navigation experience. These virtual paths may also be thought of as a relationship in three dimensions between images. In this regard, when viewing a particular panoramic image, a link may describe a first orientation of the particular panoramic image and a second orientation of another panoramic image in the set. Moving from the first orientation in the first panoramic image to the second orientation in the second panoramic image would create the feeling of moving straight ahead through a virtual space between the two panoramic images such as walking down a hallway, etc. Using the links in reverse would create the feeling of moving backwards through the same virtual space. Thus, a given set of pre-linked panoramic images may be used to provide a "static" tour of those images such that a user may click on and maneuver manually through the tour using the links.

Figure 4:
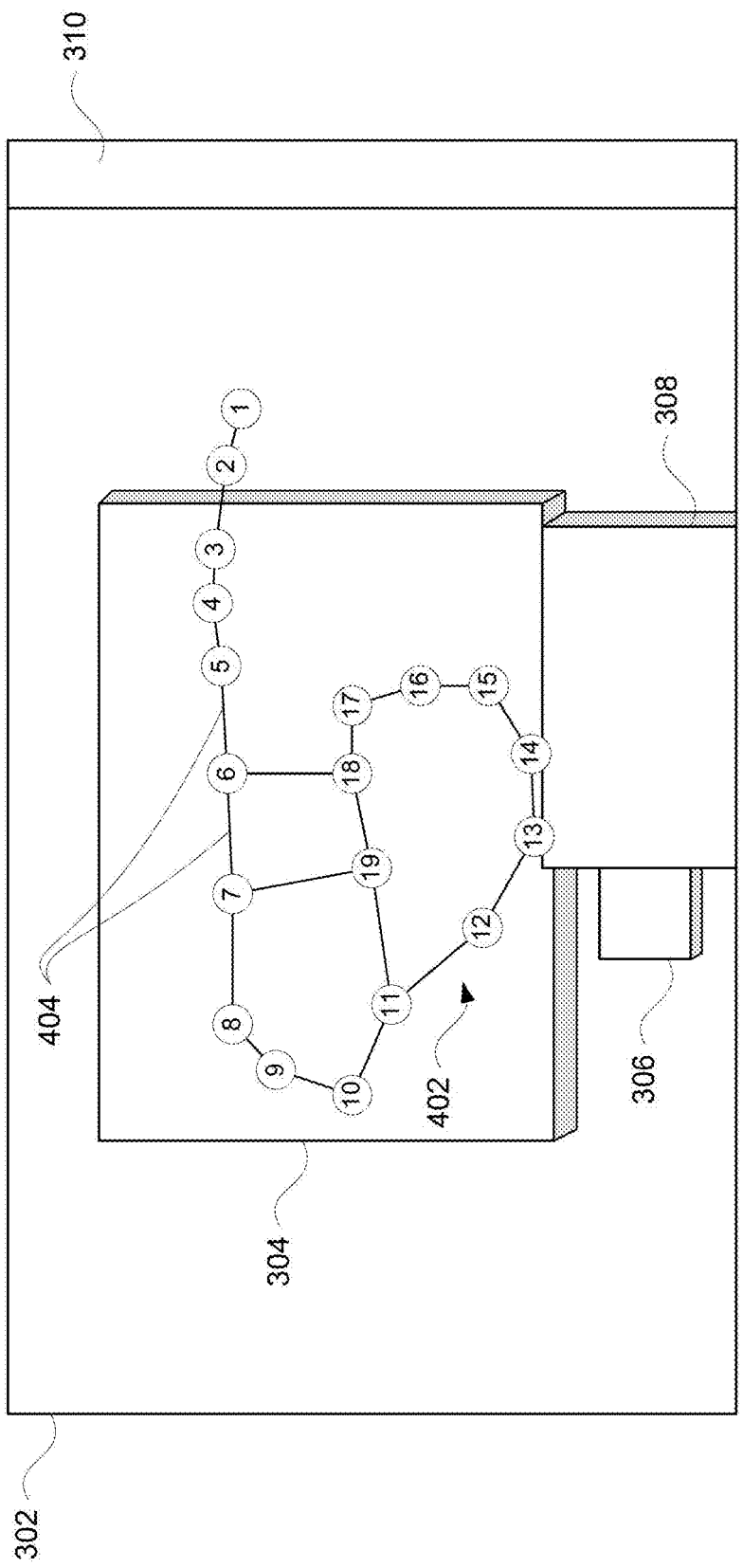
FIG. 4 is an example diagram of pre-linked panoramic images in accordance with aspects of the disclosure.

FIG. 4 is an example 400 of panoramic images 1-19 that are included in a particular set of pre-linked panoramic images 402. Linking lines 404 represent the links or relationships between the panoramic images in the set. These links and the panoramic images are arranged in a "constellation" of panoramic images. For example, the link between panoramic image 5 and 6 may describe the first and second orientations that can be used to represent a virtual path between the images. As an example, if a user was viewing panoramic image 5 and wanted to transition to panoramic image 6, the linking information may be used to transition the view of panoramic image 5 to the first orientation of the link and subsequently transition to the second orientation in panoramic image 6. In this regard, a plurality of panoramic images and links may provide a pleasing navigation experience.

As shown in FIG. 4, each panoramic image is generally linked to one or more other panoramic images in the set of panoramic images 402 (panoramic images 1-19). However, in order to provide a useful navigation experience (e.g., where the links do not pass through walls or other obstructions) the panoramic images in a set are not linked to all of the other panoramic images in a set.

Storage system 150 may also store automated tour information. This automated tour information may include information that can be used to generate an automated tour. For example, an automated tour may include an ordered set of panoramic images (or image identifiers), rotations, timing, and transition information.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110-140 (not shown).

Example Methods

Automated tours may be generated in advance (e.g., "off-line" and stored in order to be served to a user later), or in real time in response to a specific request for an automated tour. A user may use a client computing device, such as client computing device 120, to request an automated tour. As an example, a user may enter a query into a web, image or map search engine for a particular location or subject. The request may be sent to one or more server computing devices, such as server computing device 110, that in response send an option for an automated tour to the client computing device. The option may be shown as a button on a web, image or map search results page or an icon or other overlay the page. As another example, the option may appear when the user has selected a panoramic image that is part of an automated tour (if one has already been generated and stored) or if the image is included in a set of pre-linked panoramic images (if an automated tour has not been generated).

In order to generate an automated tour, a pre-linked set of panoramic images and a starting image for the tour is identified. This may be done manually, for example, by a user specifically selecting a particular panoramic image of a pre-linked set using a client computing device. As an example, a user may enter a query into an image search engine for a particular location or subject and receive a set of images in response. In some cases, the user may select a panoramic image from the set of images that is included in a pre-linked set of panoramic images. This selection may thus identify a starting image for an automated tour as well as the set of images in which the selected panoramic image appears. Alternatively, a user may request to view a constellation (for example, as shown in FIG. 4) using client computing device 120, and select one of panoramic images 1-19 as a starting image using for example a mouse pointer and corresponding user input device (e.g., a mouse or touch pad) or a finger or stylus in the case of a touch screen. The starting image may then be sent to the one or more server computing devices 110 by client computing device 120.

As another example, a user may have pre-designated a particular image in the set as a starting image. For example, an identifier indicating that the particular image is a starting image or has some type of relationship to the location (e.g., exterior of a building, interior of a building, hotel lobby, includes an exterior business sign etc.) may be assigned to that particular panoramic image by the user. In this example, when the same or a different user requests to view or generate an automated tour of a location, the client computing device may send the request to the one or more server computing devices 110. In response, the one or more server computing devices 110 may automatically identify the pre-linked set for that location as well as the starting image for the set using the identifier.

Figure 5:
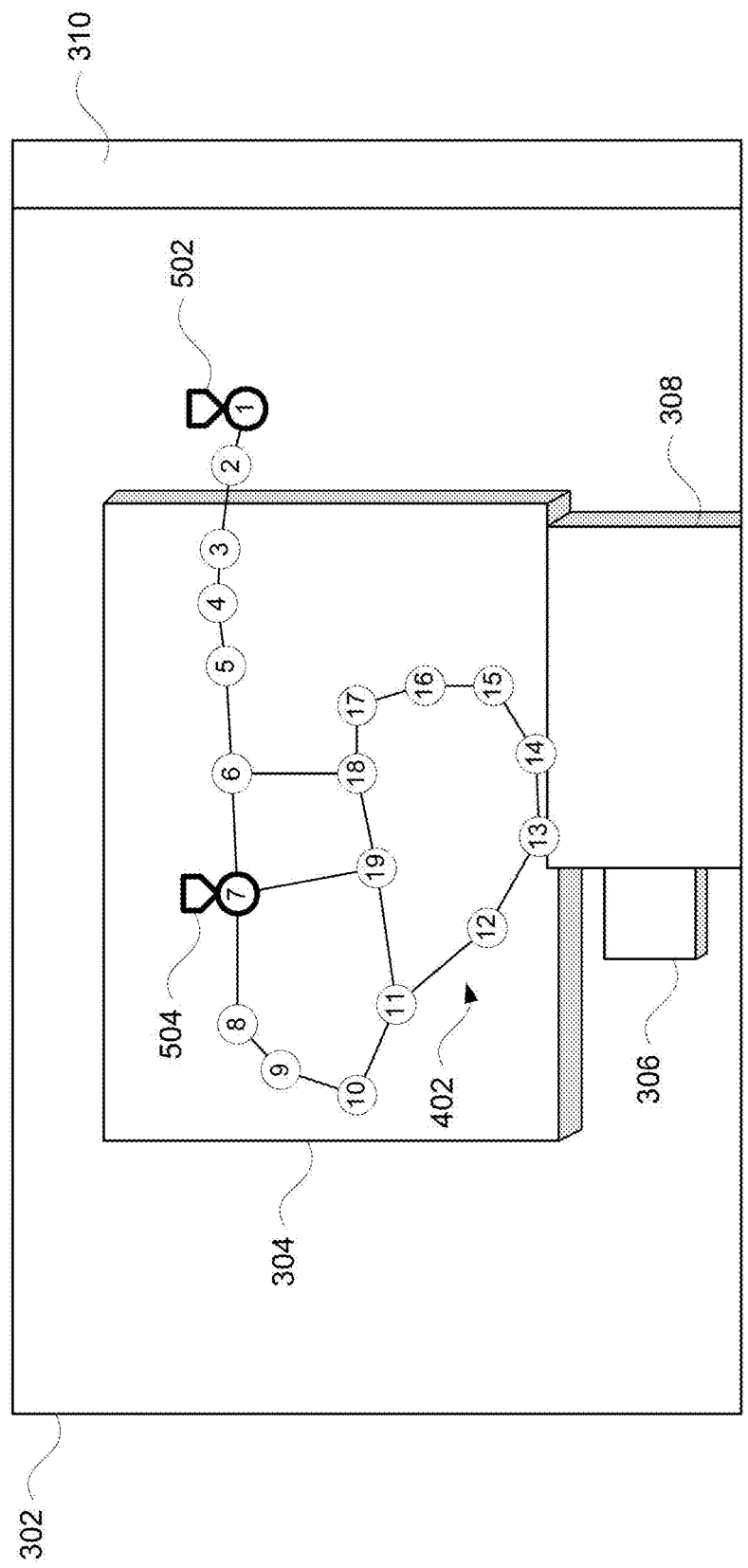
FIG. 5 is an example diagram of pre-linked panoramic images and identifiers in accordance with aspects of the disclosure.

FIG. 5 is an example 500 of the pre-linked set of panoramic images 402 where two of the panoramic images include identifiers. In this example, panoramic images 1 and 7 each include a respective identifier 502 and 504. In this example, identifier 502 may identify panoramic image 1 as a starting image or has some type of relationship to the location of the set of pre-linked panoramic images. As discussed above, identifier 502 may be used by the one or more server computing devices 100 to identify panoramic image 1 as a starting image for an automated tour.

In some examples, a target panoramic image of the pre-linked set may also be identified. As with the starting image, the target panoramic image may be selected manually using any of the examples above. Again, if selected manually, the target panoramic image may then be sent to the one or more server computing devices 110 by client computing device 120.

Alternatively, the target panoramic image may be selected automatically based on an identifier (e.g., an identifier that indicates interior of a building, best interior image of a building, includes an interior business sign, etc.). In this example, in response to a request to view or generate an automated tour, the one or more server computing devices 110 may also automatically identify the target panoramic image using the identifier. Returning to FIG. 5, identifier 504 may identify panoramic image 7 as a target image or has some type of relationship to the location of the set of pre-linked panoramic images. As discussed above, identifier 502 may be used by the one or more server computing devices 100 to identify panoramic image 502 as a starting image for an automated tour.

Once the starting image, target panoramic image, and set of pre-linked panoramic images have been identified, an automated tour may be generated. As an example, an automated tour may be generated for a location corresponding to a business within building 304, where a starting image is an exterior panoramic image and a target panoramic image is an interior panoramic image as shown in the example of FIG. 5. As noted above, the automated tour may include an ordered list of panoramic images (or image identifiers) as well as other information including for example, how to transition between panoramic images in the automated tour (e.g., timing, orientations, etc.).

As an example, the automated tour may begin by displaying the starting image and transitioning to other panoramic images in the tour. Thus, panoramic images are added to an automated tour starting with the starting panoramic image. This may continue until the target panoramic image is met. For example, the linking information may be used to determine a shortest route between the starting image and the target panoramic image along the linking lines between the panoramic images of a set of pre-linked panoramic images. As an example, Dijkstra's algorithm may be used. Returning to FIG. 5, panoramic images may be added to the tour starting with panoramic image 1 (the starting image) until panoramic image 7 is added (the target panoramic image). In this regard, the shortest route determination using the linking information would require that the panoramic images be added in the order of panoramic images 1, 2, 3, 4, 5, 6, and subsequently 7. Once the target image has been added to the automated tour, the automated tour may be complete (e.g., no additional panoramic images are added) or additional panoramic images of the set of pre-linked panoramic images may be added to the tour as discussed in detail below.

Figure 6:
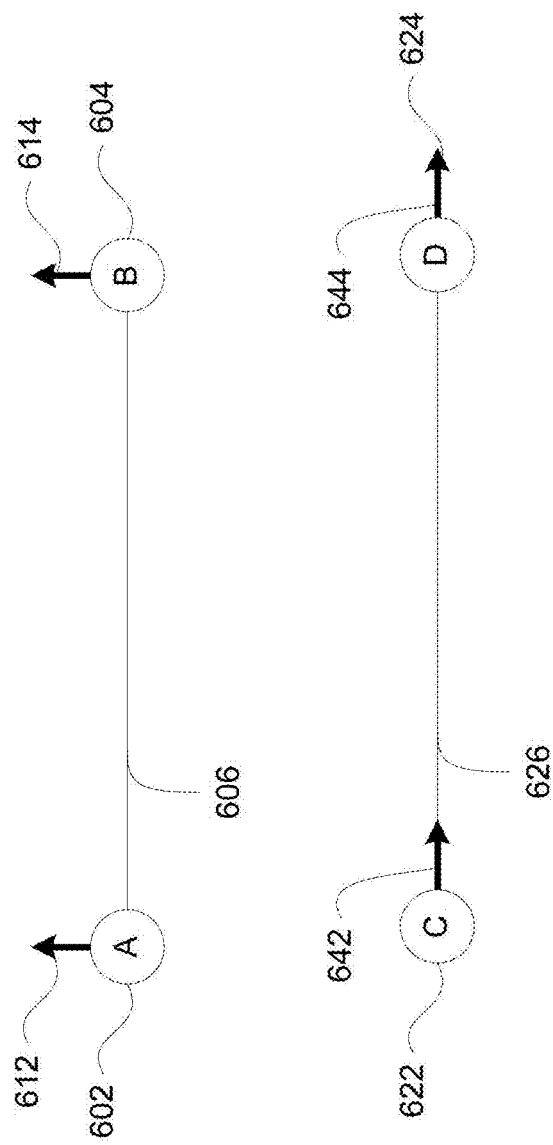
FIG. 6 is an example diagram of transitions between panoramic images in accordance with aspects of the disclosure.

As noted above, the automated tour may include transitions between the panoramic images. For example, a first transition between the starting panoramic image and the second panoramic image added to the automated tour may be of a first transition type where the direction of motion is consistent (e.g., without rotation). For example, FIG. 6 is an example 600 of two different types of transitions without rotation though various other types of consistent transitions may be used. In the example 600, panoramic images A and B are represented by circles 602 and 604, respectively. These panoramic images are linked according to line 606. Panoramic image A is shown with an arrow 612 indicating an orientation at which panoramic image A is displayed to a user relative to the circle 602. If the orientation of the view of the panoramic images remains constant, a transition from panoramic image A to panoramic image B would appear as if the user were moving sideways along line 606. The actual transition may be displayed using any type of still image transitioning effect such as the panning and zooming of the Ken Burns Effect. Panoramic image B is shown with an arrow 614 indicating an orientation at which panoramic image B is displayed to a user relative to the circle 604 after the transition. Thus, the relative orientation between the images does not change, and there is no rotation as part of the transition.

Similarly, in example 600, panoramic images C and D are represented by circles 622 and 624, respectively. These panoramic images are linked according to line 626. Panoramic image 622 is shown with an arrow 624 indicating an orientation at which panoramic image C is displayed to a user relative to the circle 622. If the orientation of the view of the panoramic images remains constant, a transition from panoramic image C to panoramic image D would appear as if the user were moving straight ahead along line 626. In this regard, panoramic image D is shown with an arrow 624 indicating an orientation at which panoramic image D is displayed to a user relative to the circle 622 after the transition. Thus, again, the relative orientation between the images does not change, and there is no rotation as part of the transition.

Additional images of the set of pre-linked panoramic images may be added to the automated tour in order according to the linking information as noted above. The transitions between these images may all be of the first transition mode, for example, consistent transitions or without rotation as described above. This may continue until a predetermined threshold condition has been met. As an example, a predetermined threshold condition may be that a number of images has been added to the tour, an image that is linked to more than two images has been added to the automated tour, or a combination of these (e.g., the threshold is met when at least one of these conditions is true).

Figure 7:
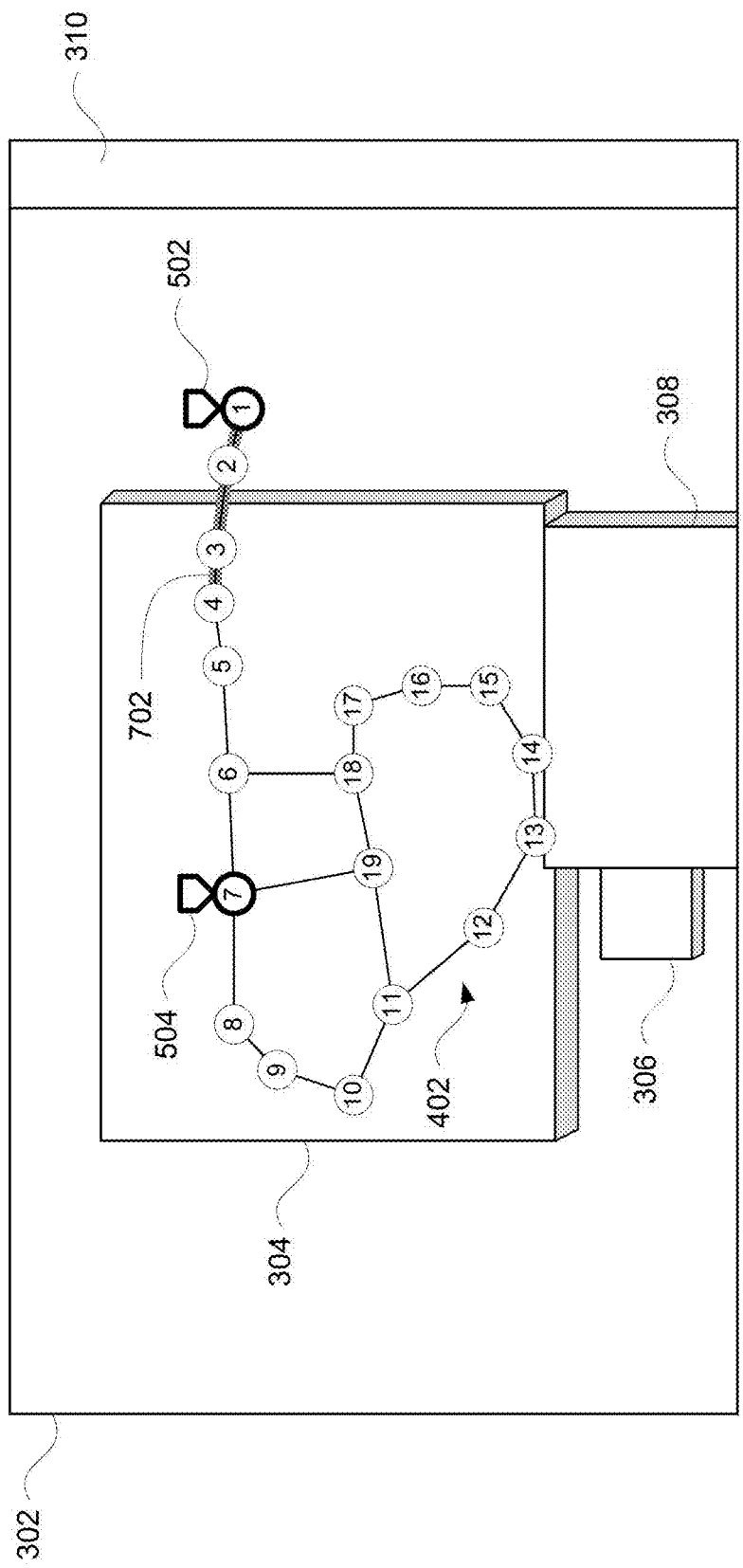
FIG. 7 is an example diagram of pre-linked panoramic images and a portion of an automated tour in accordance with aspects of the disclosure.

Example 700 of FIG. 7 is an example of a partially-generated automated tour 702. In this example, the partially-generated automated tour 702 is shown as a thicker line over the linking lines. In this example, the tour includes 4 images. As noted above, if the predetermined threshold has not been reached, each of the transitions, between panoramic images 1 and 2, panoramic images 2 and 3, and panoramic images 3 and 4 may all be other the first transition mode or a consistent transition as described above. However, if the predetermined threshold is 3 images, than the transition between panoramic images 3 and 4 as well as between any additional panoramic images of the set of pre-linked panoramic images added to the automated tour may be of a second transition mode, different from the first transition mode. The second transition mode is described in more detail below.

Figure 8:
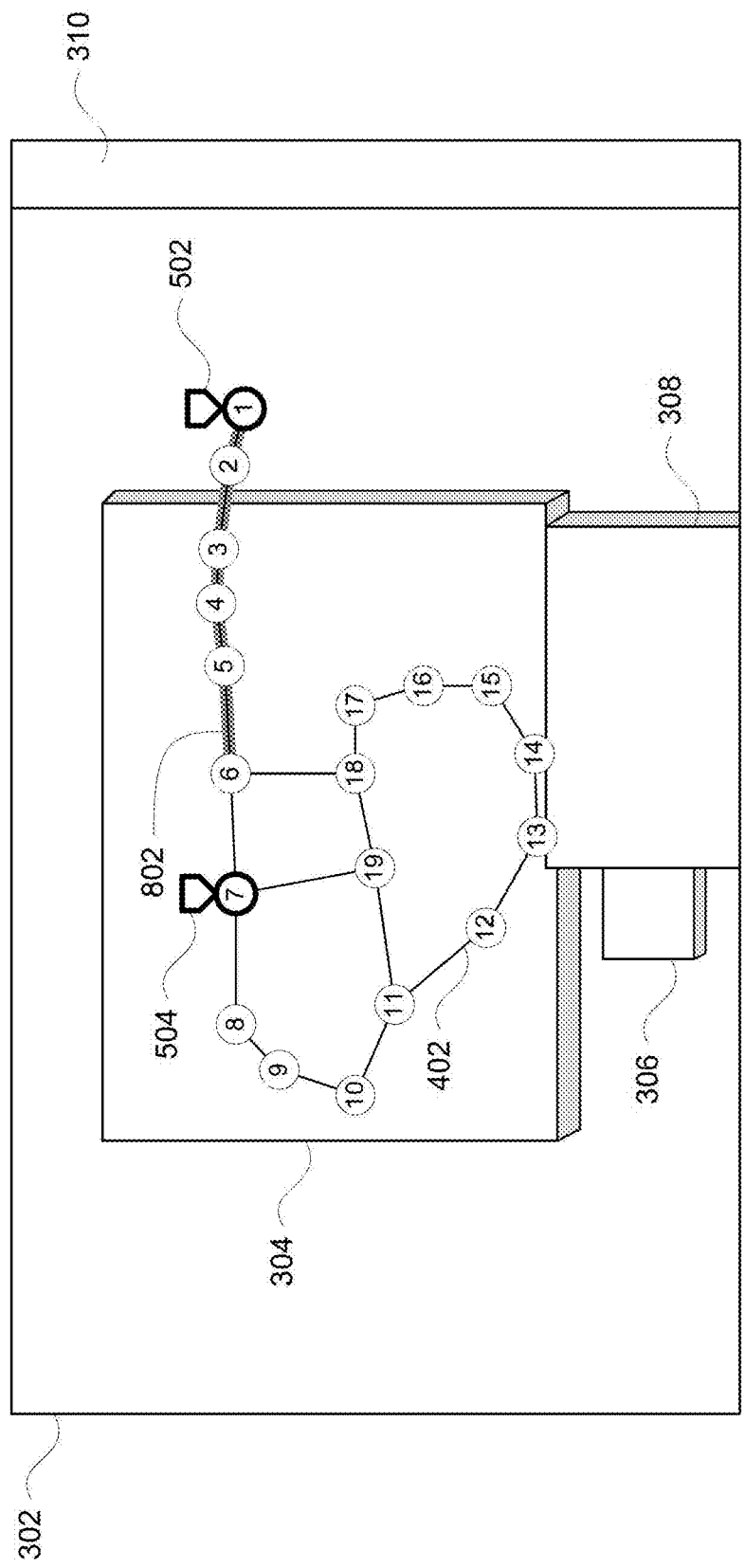
FIG. 8 is another example diagram of pre-linked panoramic images and a portion of an automated tour in accordance with aspects of the disclosure.

Example 800 of FIG. 8 is an example of a partially-generated automated tour 802. In this example, the partially-generated automated tour 802 includes panoramic image 6. Panoramic image 6 is at a branch because it connects to both panoramic image 7 as well as panoramic image 18 according to the linking lines. In other words, panoramic image 6 connects to three other panoramic images in the set of pre-lined panoramic images: panoramic images 5, 7, and 18. This is the first branch or panoramic image in the set of pre-linked panoramic images 402 that has been added to the automated tour. As noted above, if the predetermined threshold has not been reached, each of the transitions, between panoramic images 1 and 2, panoramic images 2 and 3, panoramic images 3 and 4, panoramic images 4 and 5, and panoramic images 5 and 6 may all be other the first transition mode or a consistent transition as described above. However, if the predetermined threshold is that an image that is linked to more than two images is added to the automated tour, than the transition between panoramic image 6 and the next panoramic image added to the automated tour (as well as between any additional panoramic images of the set of pre-linked panoramic images added to the automated tour) may be of the second transition mode, different from the first transition mode.

Referring to the example of a combination predetermined threshold, the threshold may include both a number of images have been added to the tour and an image that is linked to more than two images is added to the automated tour such that if either condition is met, the second transition is used between additional images added to the automated tour. For example, as shown in FIG. 8, assuming that the number of images of the predetermined threshold is 4, because this threshold will be met before panoramic image 6 (the branch) is reached, then the transitions between panoramic images 4 and 5, panoramic images 5 and 6, as well as any additional panoramic images added to the automated tour will be of the second transition mode.

Figure 9:
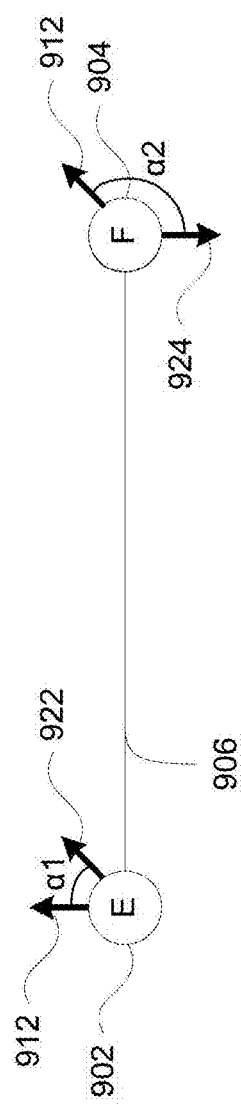
FIG. 9 is another example diagram of a transition between panoramic images in accordance with aspects of the disclosure.

The second transition mode may include various panning and rotation movements to give a user the feeling that he or she is turning in a virtual space. For example, transitions between images may include a panning rotation (rotating within a panoramic image) in a first panoramic image before displaying the second panoramic image as well as a panning rotation after the transition is complete. Panning rotations may provide a user with the feeling that he or she is turning in place "within" a panoramic image. For example, FIG. 9 is an example 900 of a transition including panning rotations. In the example 900, panoramic images E and F are represented by circles 902 and 904, respectively. These panoramic images are linked according to line 906. Panoramic image E is shown with an arrow 912 indicating an orientation at which panoramic image E is displayed to a user relative to the circle 902. If image E is displayed at the orientation of arrow 912, before displaying image F, panoramic image E may be panned or rotated an angle of $\alpha_1$ until panoramic image E is displayed at the orientation of arrow 914 relative to circle 902. At this point, the a transition from panoramic image E to panoramic image F would appear as if the user were moving along line 906 but facing in the direction of arrow 922 until panoramic image F is displayed in the direction of arrow 912 relative to circle 904. In addition, a second panning may be performed such that panoramic image F may be panned or rotated an angle of $\alpha_2$ until panoramic image F is displayed at the orientation of arrow 924 relative to circle 904. In this example, the second transition mode, as applied between two panoramic images, may include a first panning in the first panoramic image, a transition between the first panoramic image and the second panoramic image, and a second panning in the second panoramic image.

These rotations may be tuned using various parameters that enable different automated tours to be less predictable and more varied. As one example, a transition turn percent parameter may be used to determine a percentage of transitions that will include at least some degree of rotation (e.g., 35%). A skip rotate percentage parameter may be used to determine a percentage of transitions which will not be followed immediately by a panning rotation (e.g., 35%). For example, returning to FIG. 9, the panning rotation in panoramic image F may be dropped from the transition. Another parameter may include a minimum rotation degree (e.g., 130 degrees) for panning rotations before or after transitions. In this regard, the transitions between images need not always be from the point of view of a user moving forward through space, but also to the side, backwards, etc. as described above.

In order to maintain overlapping views between transitions, an overlap threshold parameter may be used. As an example, the fields of view of two panoramic images when the automated tour switches between the two panoramic images may be projected onto an imaginary wall at a fixed distance. As an example, the threshold parameter may be defined as a percentage of overlap between these projections, such as 25%, 50%, 75%, or more or less. In that regard, if the overlap of (a) the cone that is projected from the first paranoiac image with (b) the cone that is projected from the second panoramic image does not satisfy the overlap threshold parameter, then the amount of panning rotation in the transition from the first panoramic image may be increased in order to ensure that the overlap threshold parameter is satisfied. If the panning rotation required to meet the overlap is less than the minimum rotation degree parameter, the minimum rotation degree parameter may be adjusted, for example, by decreasing the value or simply foregoing the requirement.

Figure 10:
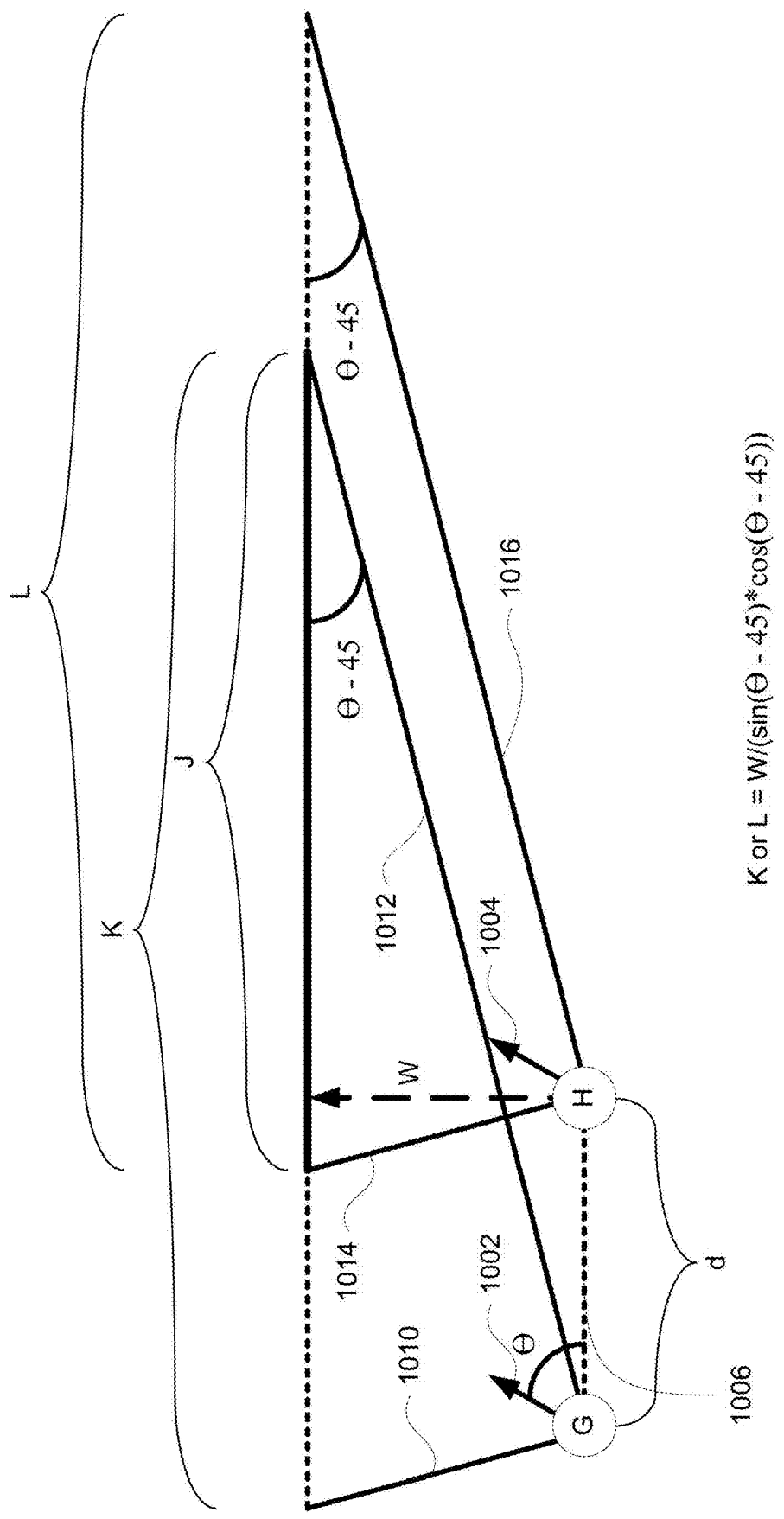
FIG. 10 is an example diagram for determining a percentage of overlap between panoramic images in accordance with aspects of the disclosure.

As shown in the example 1000 of FIG. 10, the fields of view of two panoramic images G and H when displayed at the same relative orientation (e.g., both in the orientation of arrows 1002 and 1004 at an angle θ from a linking line 1006) may be determined. The orientation of arrows 1002 and 1004 may be determined based on the transition mode between these two images in the tour. For instance, the orientation may be determined based on whether the transition includes is a panning rotation in panoramic image G and the orientation of panoramic image G prior to the start of the transition. Panoramic images G and H are separated by a distance d along linking line 1006. The field of view of panoramic image G is defined between lines 1010 and 1012, where arrow 1002 is centered between lines 1010 and 1012. The field of view of panoramic image H is defined between lines 1014 and 1016, where arrow 1004 is centered between lines 1014 and 1016. The viewing angle (e.g., the angular distance between lines 1010 and 1012 or lines 1014 and 1016) of each field of view will depend upon the size of the images, such as the length, width, number of pixels, etc. that will be displayed in the automated tour.

The fields of view may be projected onto an imaginary wall at a fixed distance w from each of the panoramic images G and H. As an example, w may be an arbitrary distance such as 2 meters or more or less. Although the example 1000 is depicted in two dimensions, the projections may be in three dimensions on the wall and appear in the shape of a cone or rectangle. The projection from panoramic image G covers the area of K on the wall, and the projection from panoramic image H covers the area of L on the wall. The overlap between these projections is the area of J. The percentage of overlap may be defined by the ration of J to K (or J to L). This percentage of overlap may be compared to the overlap threshold parameter. If the percentage of overlap (J/K) does not meet the overlap threshold parameter (for example, 50%), then the amount of panning rotation in the transition from the first panoramic image may be increased in order to ensure that the overlap threshold parameter is satisfied, so that J/K is at least 50%. If the rotation required to meet the overlap is less than the minimum rotation degree parameter, the minimum rotation degree parameter discussed above may be adjusted, for example, by decreasing the value or simply foregoing the requirement.

Figure 11:
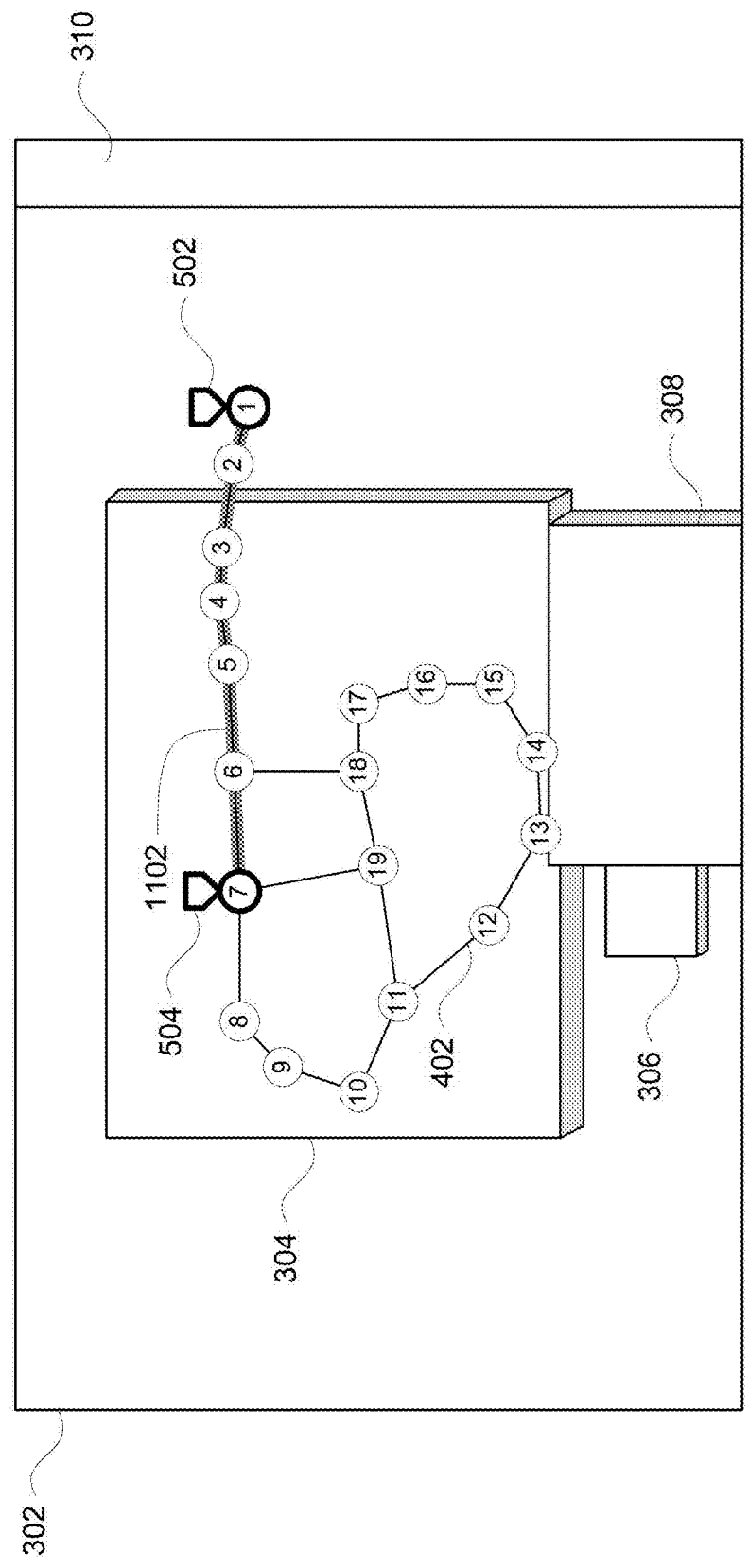
FIG. 11 is a further example diagram of pre-linked panoramic images and a portion of an automated tour in accordance with aspects of the disclosure.

Once the second panoramic image is added to the automated tour, as noted above, if at least a threshold number of panoramic images of the set of pre-linked panoramic images (e.g., a minimum number of panoramic images) have been added to the automated tour, then the automated tour may end. As shown in FIG. 11, example 1100 includes a completed automated tour 1102. In this example, the automated tour 1102 includes seven panoramic images, as well as the transitions between them. This includes panoramic image 7, the target panoramic image. Here, the minimum number of panoramic images may have been 7 or less such that the automated tour is complete when panoramic image has been added.

If the minimum number of panoramic images has not been met, additional panoramic images of the set of pre-linked images may be added to the tour until the minimum number of panoramic images has been met. These images may be selected for example, using the linking information to identify a route along the linking lines to the panoramic image of the set of pre-linked panoramic images that is farthest in distance (not necessarily along the linking lines from the target panoramic image) and not already included in the automated tour. The route may be determined using any path planning algorithm such as one that determines the route to that farthest panoramic image that passes through as many panoramic images as possible along the linking lines. In some cases, the route may also be determined such that it does not cross the same panoramic image twice and/or passes through the fewest number of panoramic images already added to the automated tour.

Panoramic images along the route may then be added to the automated tour with transitions as discussed above until the minimum number of panoramic images has been met. If the farthest panoramic image has been added to the panoramic tour, for instance by adding panoramic images along the route as noted above, but the minimum number of panoramic images has not been met, another farthest panoramic image from that farthest image may be identified and used to add additional panoramic images as described above and so on until the minimum number of panoramic images has been met.

Figure 12:
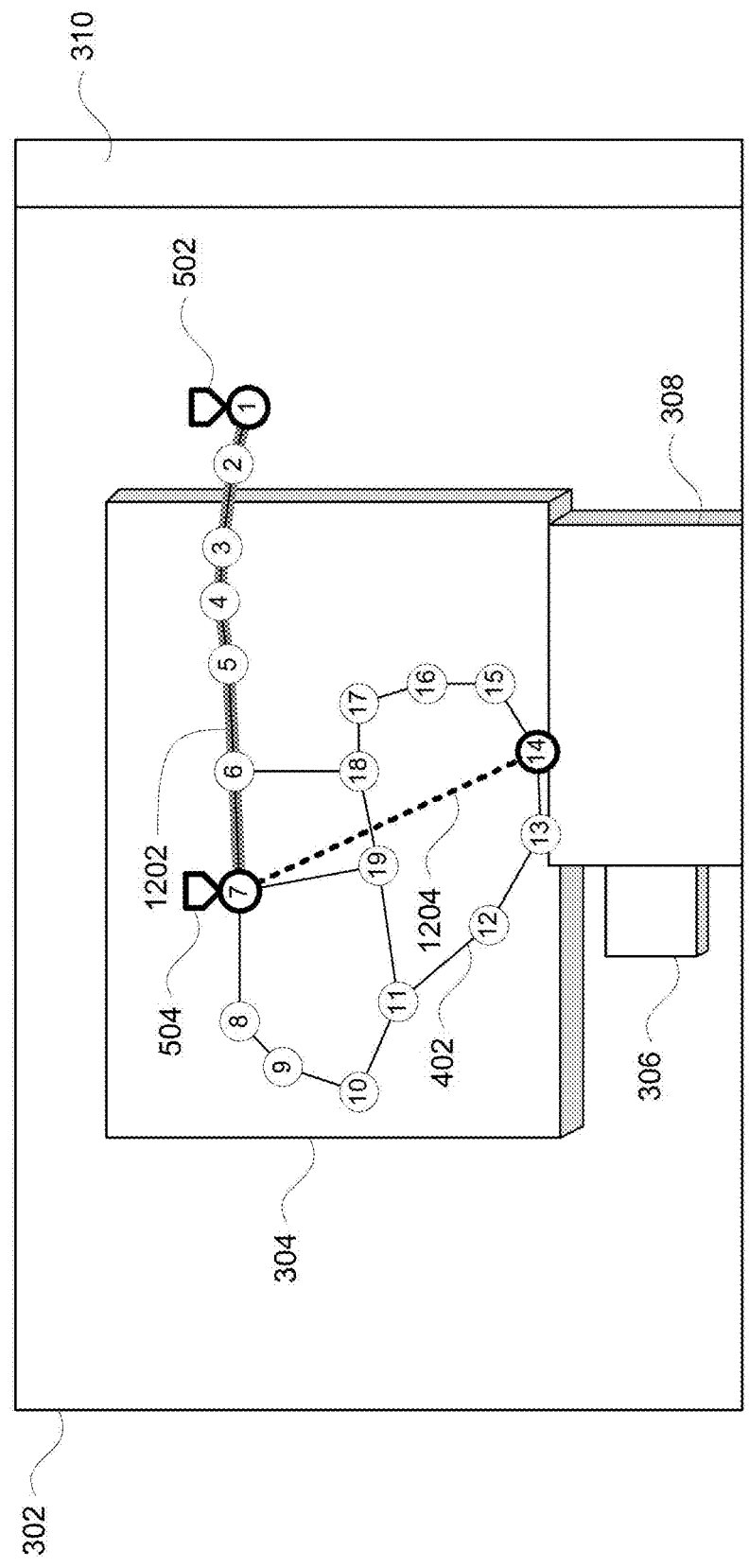
FIG. 12 is an example diagram of pre-linked panoramic images and a portion of an automated tour in accordance with aspects of the disclosure.

FIG. 12 is an example 1200 depicting the identification of the farthest panoramic image from eh target panoramic image. Here, panoramic image 14 is farthest in distance from panoramic image 7. As can be seen, dashed line 1204 does not follow the linking lines. In addition, while panoramic image 1 is physically farthest from panoramic image 7, it has already been added to the partially-completed automated tour 1202.

Once panoramic image 14 has been identified as farthest from panoramic image 7, a route between panoramic image 7 and panoramic image 14 may be determined. As noted above, the route may be determined such that the route that passes through as many panoramic images as possible along the linking lines without crossing the same panoramic image twice. For example, referring to example 1300 of FIG. 13, the determined route may include transitioning from panoramic image 7 to panoramic image 8 to panoramic image 9 to panoramic image 10 to panoramic image 11 to panoramic image 19 to panoramic image 18 to panoramic image 17 to panoramic image 16 to panoramic image 15 and finally, to panoramic image 14 along the linking lines.

Panoramic images along this route may then be added to the automated tour with transitions as described above until the minimum number of panoramic images has been met. Thus, if the minimum number of panoramic images is 12, the automated tour may be complete when panoramic image 19 has been added (e.g., before panoramic image 14 is added). However, if the minimum number of panoramic images is 17, the automated tour may be complete when panoramic image 17 is added as shown in the completed panoramic tour 1302 of FIG. 13.

Figure 13:
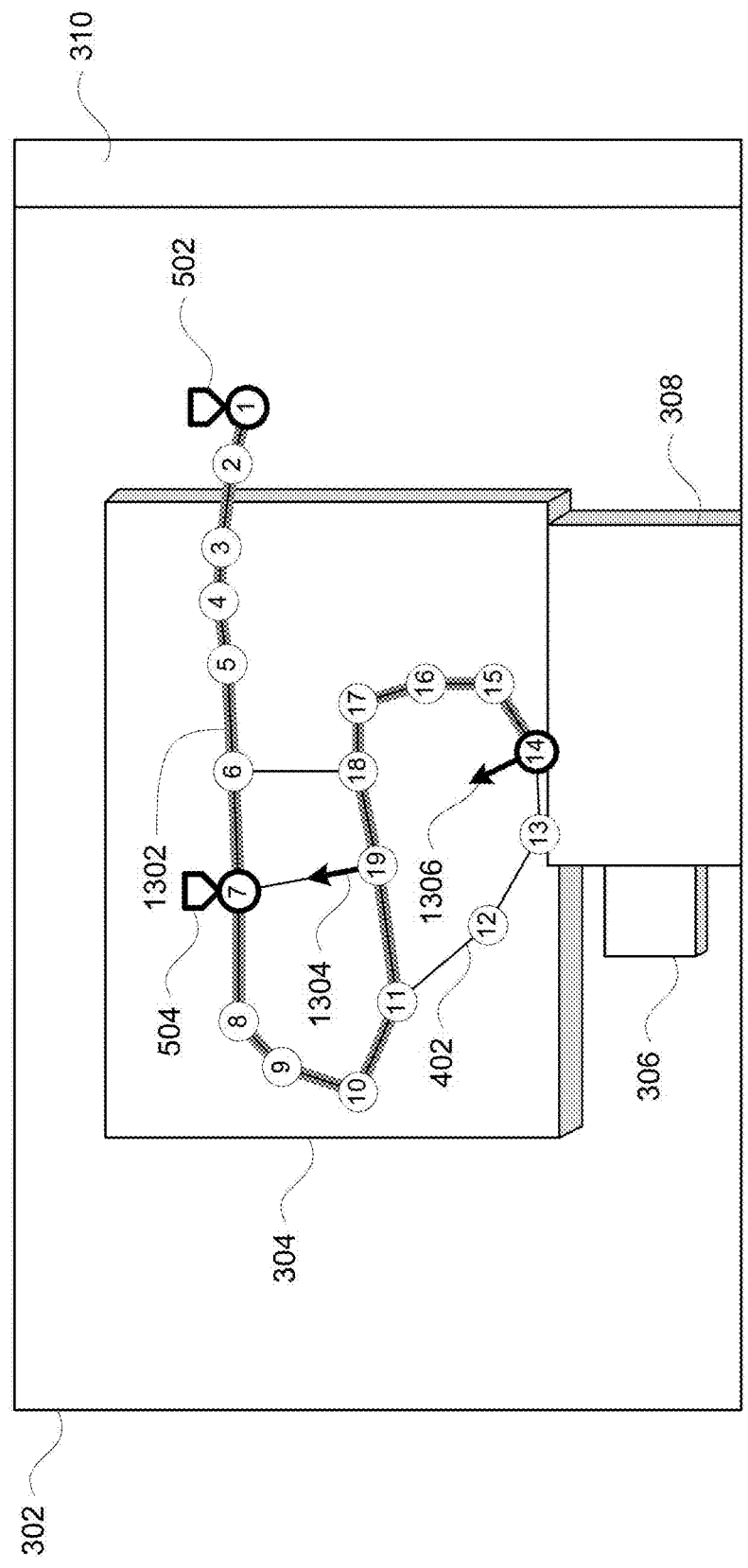
FIG. 13 is an example diagram of pre-linked panoramic images and an automated tour in accordance with aspects of the disclosure.

Other effects may be used to make the automated tour interesting. For example, the last panoramic image in an automated tour may be rotated so that the last view in an automated tour is oriented towards the target panoramic image. For example, as shown in FIG. 13, if panoramic image 19 is the last panoramic image in the automated tour, a panning rotation may be added to the end of the tour so that the panoramic image 19 is rotated into the orientation of arrow 1304 such that the user has the feeling the he or she is facing the location of the target panoramic image 7. Similarly, if panoramic image 14 is the last panoramic image in the automated tour, a panning rotation may be added to the end of the tour so that the panoramic image 14 is rotated into the orientation of arrow 1306 such that the user has the feeling the he or she is facing the location of the target panoramic image 7.

Other parameters may also be used to tune the transitions, of the first or second transition mode as applicable. For example, the amount of time that it takes to complete a transition between images in either transition mode, the percentage of time spent rotating for a transition in the second transition mode, the minimum amount of time for a rotation in the second transition mode, the speed of a rotation (e.g., degrees per second of rotation) in the second transition mode, whether that speed is adjusted during a rotation (e.g., faster, slower, faster) in the second transition mode, etc.

As noted above, the completed automated tours may be served immediately to a user (e.g., in the case of an automated tour generated in response to a specific request) or stored for later service to users.

Figure 14:
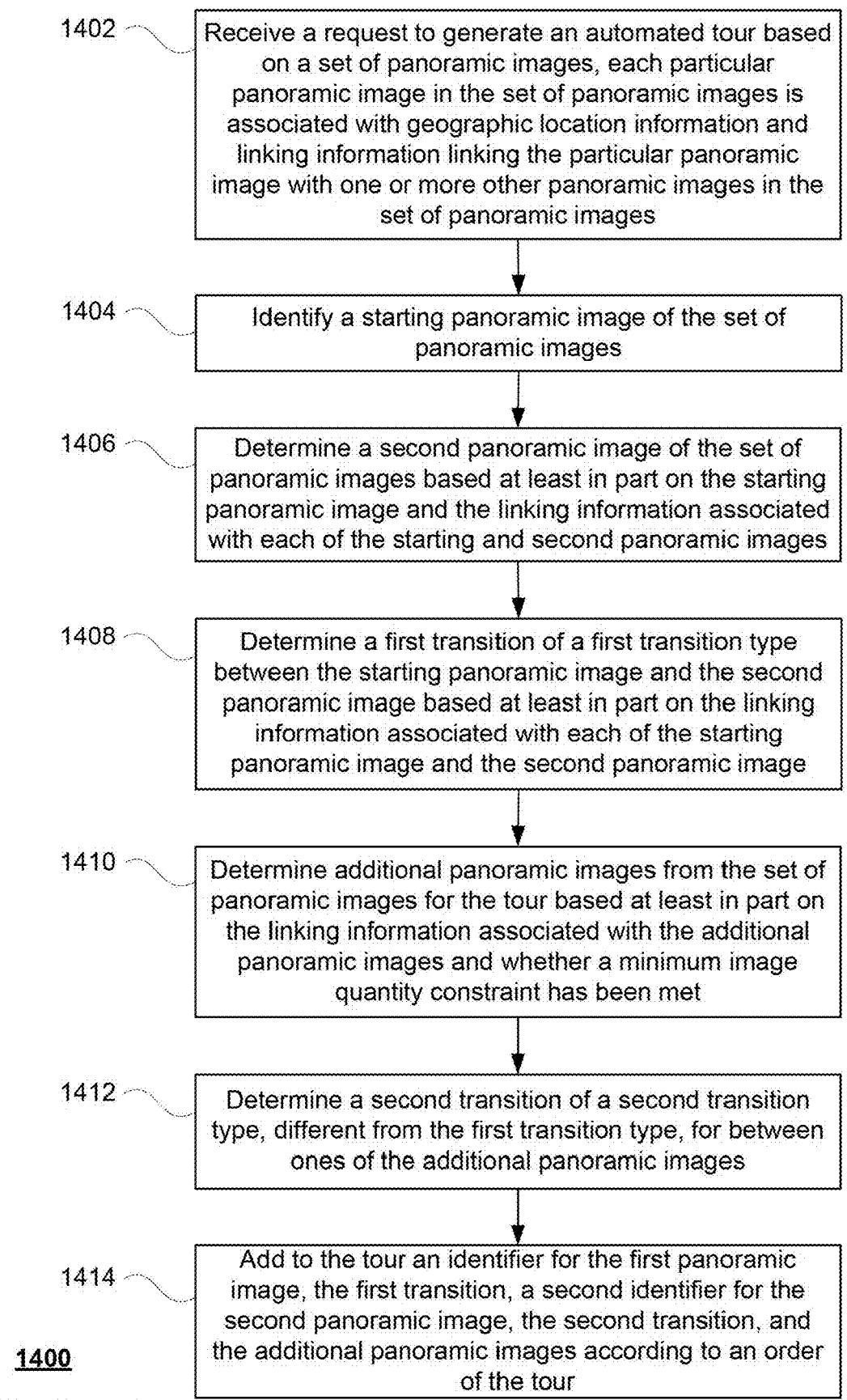
FIG. 14 is a flow diagram in accordance with aspects of the disclosure.

Flow diagram 1400 of FIG. 14 is an example of some of the features described above which may be performed by one or more computing devices such as one or more computing devices 110. In this regard, a request to generate an automated tour based on a set of panoramic images is received by the one or more computing devices at block 1402. Each particular panoramic image in the set of panoramic images is associated with geographic location information and linking information linking the particular panoramic image with one or more other panoramic images in the set of panoramic images. The one or more computing devices identify a starting panoramic image of the set of panoramic images at block 1404. A second panoramic image of the set of panoramic images is determined based at least in part on the starting panoramic image and the linking information associated with each of the starting and second panoramic images at block 1406. A first transition of a first transition mode between the starting panoramic image and the second panoramic image is determined based at least in part on the linking information associated with each of the starting panoramic image and the second panoramic image at block 1408. The one or more computing devices also determine additional panoramic images from the set of panoramic images for the tour based at least in part on the linking information associated with the additional panoramic images and whether a minimum image quantity constraint has been met at block 1410. A second transition of a second transition mode, different from the first transition mode, is determined for between ones of the additional panoramic images at block 1412. In addition, an identifier for the first panoramic image, the first transition, a second identifier for the second panoramic image, the second transition, and the additional panoramic images are added to the tour according to an order of the tour.

Unless stated otherwise, the foregoing alternative examples are not mutually exclusive. They may be implemented in various combinations to achieve unique advantages. As these and other variations and combinations of the

The invention claimed is:

1. A method of generating an automated tour, the method comprising:
   identifying, by one or more processors, a first image from a plurality of pre-linked images;
   displaying, by the one or more processors, the first image;
   selecting, by the one or more processors, a second image from the plurality of pre-linked images based on a link between the first image and the second image;
   generating, by the one or more processors, the automated tour using the first image, the second image, and a transition between the first image and the second image; and
   determining, by the one or more processors after transitioning to the second image, an end of the automated tour when a minimum number of images of the plurality of pre-linked images has been displayed.

2. The method of claim 1, further comprising automatically generating, by the one or more processors, the transition between the first image and the second image, wherein the transition includes consistent non-rotational movement in a first direction from the first image to the second image or rotating the first image from being displayed at a first orientation to being displayed at a second orientation before displaying the second image.

3. The method of claim 2, wherein the consistent movement in a first direction from the first image to the second image provides a feeling of moving along a line in the first direction.

4. The method of claim 2, wherein when the transition includes consistent non-rotational movement, the transition further includes displaying a first portion of the first image at a first orientation to displaying a second portion of the first image at the first orientation before displaying the second image.

5. The method of claim 1, further comprising:
   receiving a request for the automated tour from a first device; and
   providing for display the automated tour to the first device.

6. The method of claim 5, further comprising displaying the second image at the first orientation.

7. The method of claim 5, wherein the transition further includes after displaying the second image, a second consistent movement from a first portion of the second image to a second portion of the second image when the second image is a last image in the automated tour.

8. The method of claim 1, wherein the link describes a first orientation of the first image and a second orientation of the second image.

9. The method of claim 1, wherein generating the transition further includes a transitioning effect.

10. The method of claim 9, wherein the transitioning effect includes at least one of panning or zooming.

11. The method of claim 1, wherein the transition corresponds to a user moving forward, backward, or forward and backward through a space from the first image to the second image.

12. The method of claim 1, wherein generating the transition is further based on an overlap threshold parameter.

13. The method of claim 12, wherein the overlap threshold parameter corresponds to projecting a first field of view of the first image and a second field of view of the second image and determining a percentage of overlap between the projections.

14. A system for generating an automated tour, the system comprising one or more processors configured to:
   identify a first image from a plurality of pre-linked images;
   display the first image;
   select a second image from the plurality of pre-linked images based on a link between the first image and the second image;
   generate the automated tour using the first image, the second image, and a transition between the first image and the second image; and
   determine, after transitioning to the second image, an end of the automated tour when a minimum number of images of the plurality of pre-linked images has been displayed.

15. The system of claim 14, wherein the one or more processors are further configured to generate the transition between the first image and the second image, wherein the transition includes consistent non-rotational movement in a first direction from the first image to the second image or rotating the first image from being displayed at a first orientation to being displayed at a second orientation before displaying the second image.

16. The system of claim 15, wherein the consistent movement in a first direction from the first image to the second image provides a feeling of moving along a line in the first direction.

17. The system of claim 14, wherein the one or more processors are further configured to:
   display a first portion of the first image at a first orientation; and
   display a second portion of the first image at the first orientation after displaying the first portion and before displaying the second image.

18. The system of claim 14, wherein the one or more processors are further configured to display the second image at the first orientation.

19. The system of claim 15, wherein the transition further includes after displaying the second image, a second consistent movement from a first portion of the second image to a second portion of the second image when the second image is a last image in the automated tour.

20. The system of claim 14, wherein the transition corresponds to a user moving forward, backward, or forward and backward through a space from the first image to the second image.

* * * * *